US 10,387,185 B2

(12) United States Patent
Langer et al.

(10) Patent No.: US 10,387,185 B2
(45) Date of Patent: Aug. 20, 2019

(54) PERFORMING MONITORING AND MIGRATION OF VIRTUAL MACHINES IN A DATA CENTER TO PREVENT SERVICE LEVEL DEGRADATION DUE TO THE LOAD IMPOSED BY THE MONITORING

(71) Applicant: Telefonaktiebolaget LM Ericsson (publ), Stockholm (SE)

(72) Inventors: Alexander Langer, Herzogenrath (DE); Bengt-Dirk Heye, Köln (DE); Daniela Ionita, Herzogenrath (DE); Tomas Muehlhoff, Herzogenrath (DE); Oliver Speks, Eschweiler (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 50 days.

(21) Appl. No.: 15/526,357

(22) PCT Filed: Nov. 21, 2014

(86) PCT No.: PCT/EP2014/075337
§ 371 (c)(1),
(2) Date: May 12, 2017

(87) PCT Pub. No.: WO2016/078729
PCT Pub. Date: May 26, 2016

(65) Prior Publication Data
US 2017/0315836 A1   Nov. 2, 2017

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5088* (2013.01); *G06F 11/301* (2013.01);
(Continued)

(58) Field of Classification Search
CPC ............... G06F 9/45558; G06F 9/5088; G06F 11/3433; G06F 11/349; G06F 11/301;
(Continued)

(56) References Cited

U.S. PATENT DOCUMENTS 8,102,781 B2 * 1/2012 Smith ................... G06F 9/4856
370/252
2006/0218533 A1 * 9/2006 Koduru ............... G06F 11/3447
717/124
(Continued)

FOREIGN PATENT DOCUMENTS

EP    2335162 B1    11/2013
JP    2013246532 A    12/2013

OTHER PUBLICATIONS

Wood, T. et al., "Black-box and Gray-box Strategies for Virtual Machine Migration", 4th USENIX Symposium on Networked Systems Design & Implementation, Apr. 1, 2007, pp. 229-242.

*Primary Examiner* — Meng Ai T An
*Assistant Examiner* — Michael W Ayers
(74) *Attorney, Agent, or Firm* — Patent Portfolio Builders, PLLC (57) ABSTRACT

The present disclosure relates to a method for monitoring virtual machines in a data center, to a computer program for executing the method, to a monitoring control unit for monitoring virtual machines in a data center, as well as to a data center comprising the monitoring control unit. The method comprises: receiving (S502) a request to monitor a target virtual machine executing on a target computing unit hosted in the data center; identifying (S504) a current allocation of one or more virtual machines to one or more computing units hosted in the data center; determining (S506) an enhanced allocation of the one or more virtual machines to one or more computing units hosted in the data center, the enhanced allocation reducing a load imposed on
(Continued)

the target computing unit compared to the load imposed on the target computing unit under the current allocation; migrating (S508) the one or more virtual machines so as to reallocate the one or more virtual machines from the current allocation to the enhanced allocation; and monitoring (S510) the target virtual machine upon completion of the migration of the one or more virtual machines.

20 Claims, 6 Drawing Sheets (51) Int. Cl.
  *G06F 11/30* (2006.01)
  *G06F 11/34* (2006.01)
  *H04L 12/26* (2006.01)
  *H04L 12/24* (2006.01)
(52) U.S. Cl.
  CPC ........ *G06F 11/349* (2013.01); *G06F 11/3433* (2013.01); *H04L 41/0816* (2013.01); *H04L 43/0882* (2013.01); *G06F 11/3096* (2013.01); *G06F 2009/4557* (2013.01); *G06F 2009/45591* (2013.01); *G06F 2201/815* (2013.01)
(58) Field of Classification Search
  CPC ......... G06F 11/3096; G06F 2009/4557; G06F 2009/45591; G06F 2201/815; H04L 41/0816; H04L 43/0882

See application file for complete search history.

(56) References Cited

U.S. PATENT DOCUMENTS

| | | | |
|---|---|---|---|
| 2008/0104608 A1* | 5/2008 | Hyser | G06F 9/5027 |
| | | | 718/105 |
| 2008/0304423 A1 | 12/2008 | Chuang et al. | |
| 2010/0332657 A1* | 12/2010 | Elyashev | H04L 67/1002 |
| | | | 709/226 |
| 2012/0144389 A1 | 6/2012 | Hicks et al. | |
| 2012/0304172 A1* | 11/2012 | Greifeneder | G06F 9/45504 |
| | | | 718/1 |
| 2013/0022352 A1* | 1/2013 | Yamashita | H04J 14/0212 |
| | | | 398/34 |
| 2013/0174152 A1* | 7/2013 | Yu | G01R 21/00 |
| | | | 718/1 |
| 2013/0212255 A1 | 8/2013 | Chao et al. | |
| 2014/0007089 A1* | 1/2014 | Bosch | G06F 9/4856 |
| | | | 718/1 |
| 2014/0164609 A1 | 6/2014 | Kay | |
| 2014/0201737 A1* | 7/2014 | Mitkar | G06F 9/461 |
| | | | 718/1 |

\* cited by examiner

PERFORMING MONITORING AND MIGRATION OF VIRTUAL MACHINES IN A DATA CENTER TO PREVENT SERVICE LEVEL DEGRADATION DUE TO THE LOAD IMPOSED BY THE MONITORING

TECHNICAL FIELD

The present disclosure generally relates to monitoring virtual machines in a data center. More particularly, the present disclosure relates to a method for monitoring virtual machines in a data center, to a computer program for executing the method, to a monitoring control unit for monitoring virtual machines in a data center, as well as to a data center comprising the monitoring control unit.

BACKGROUND

In the recent years, cloud computing has evolved as a general concept which allows provisioning of computer services and resources in form of an online service. Through cloud computing, clients can store data remotely and execute remote applications that are not installed on a local computer. Cloud computing generally involves provisioning of an abstraction to a large computing infrastructure which comprises large groups of networked remote servers, typically (but not necessarily) provided in a data center facility.

Services models provided in connection with cloud computing typically comprise Infrastructure as a Service (IaaS), Platform as a Service (PaaS) and Software as a Service (SaaS). In IaaS, clients are provided access to physical or virtualized computer hardware resources, such as virtualized compute, network and storage units. In PaaS, clients are provided access to software execution platform environments and, in SaaS, clients are provided access to application programs which are executed on the cloud infrastructure. SaaS is also known as "software on demand".

In a data center, such services may be realized using virtualization technology. According to the concept of virtualization, one or more virtual machines may be executed on a single physical computing unit, such as a server or server blade. Virtual machines are logically separated from each other and share processor, memory and/or network resources of the underlying computing unit. So-called hypervisors are employed on the computing units for the allocation of hardware resources to the virtual machines executed thereon. An operating system may be installed on each virtual machine, just like on a physical machine, which may be used to execute client applications thereon.

A cloud infrastructure management system typically decides on the allocation of virtual machines to the physical computing units available in the data center. Such allocation may be determined taking into account the resource requirements of the applications to be executed as well as the physical resources of the computing units themselves. If an allocation needs to be changed, virtual machines may be migrated from one computing unit to another by the cloud infrastructure management system. Migration may be performed on virtual machines while their execution continues (so-called "live migration"), or may require to shut down a respective virtual machine on the donor computing host and instantiate the virtual machine again on a destination computing host.

There may be a need to monitor a specific virtual machine or an application executed thereon for trouble-shooting purposes. This may be the case, for example, if an application executed on the virtual machine reveals resource consumption to an abnormal extent. Also, it may be necessary to monitor network traffic generated by an application and analyze the traffic for debugging purposes, performance analysis, protocol compliance verification or the like. Monitoring itself, however, may create an additional load to the virtual machine, to the underlying computing unit, or to other components affected by the ongoing monitoring activity which, in some cases, may overload the resources of these components. This may result in unwanted application behavior, service level degradation or other potential malfunction.

SUMMARY

Accordingly, there is a demand to provide a technique which effectively avoids malfunction when virtual machines are monitored in a data center.

This demand is achieved by the independent claims. Advantageous embodiments are described in the dependent claims.

According to a first aspect, a method for monitoring virtual machines in a data center is provided. The method comprises: (a) receiving a request to monitor a target virtual machine executed on a target computing unit hosted in the data center; (b) identifying a current allocation of one or more virtual machines to one or more computing units hosted in the data center; (c) determining an enhanced allocation of the one or more virtual machines to one or more computing units hosted in the data center, the enhanced allocation reducing a load imposed on the target computing unit compared to the load imposed on the target computing unit under the current allocation; (d) migrating the one or more virtual machines so as to reallocate the one or more virtual machines from the current allocation to the enhanced allocation; and (e) monitoring the target virtual machine upon completion of the migration of the one or more virtual machines.

According to a second aspect, a computer program product is provided. The computer program product comprises program code portions for carrying out one or more of the steps of any of the method aspects described herein, when the computer program product is run or executed on a computer system or on one or more computing devices. The computer program product may be stored on a computer readable recording medium, such as a permanent or rewritable memory.

According to a third aspect, a monitoring control unit for monitoring virtual machines in a data center is provided. The monitoring control unit comprises (a) a receiving component configured to receive a request to monitor a target virtual machine executed on a target computing unit hosted in the data center; (b) an identifying component configured to identify a current allocation of one or more virtual machines to one or more computing units hosted in the data center; (c) a determining component configured to determine an enhanced allocation of the one or more virtual machines to one or more computing units hosted in the data center, the enhanced allocation reducing a load imposed on the target computing unit compared to the load imposed on the target computing unit under the current allocation; (d) a migrating component configured to migrate the one or more virtual machines so as to reallocate the one or more virtual machines from the current allocation to the enhanced allocation; and (e) a monitoring component configured to monitor the target virtual machine upon completion of the migration of the one or more virtual machines.

According to a fourth aspect, a data center comprising the monitoring control unit described above is provided.

All of the aspects described herein may be implemented by hardware circuitry and/or by software. Even if some of the aspects are described herein with respect to the monitoring control unit, these aspects may also be implemented as a method or as a computer program for performing or executing the method. Likewise, aspects described as or with reference to a method may be realized by suitable components in the monitoring control unit, the data center comprising the monitoring control unit, or by means of the computer program.

BRIEF DESCRIPTION OF THE FIGURES

In the following, the present disclosure will further be described with reference to exemplary implementations illustrated in the figures, in which.

DETAILED DESCRIPTION

The term "monitoring" as referred to herein can be, but is not limited to, an activity or process that may comprise observing and collecting state data, communication or performance data.

The "target virtual machine" referred to herein denotes the virtual machine that is subject to be monitored. For the purpose of the present disclosure, the expression "monitoring the target virtual machine" may comprise monitoring any components that are associated with the execution of the target virtual machine. This may include both software and hardware components. The target virtual machine may thus, for example, be monitored as a software component itself. Monitoring the target virtual machine may also include monitoring an operating system installed on the target virtual machine or specifically monitoring one or more applications being executed thereon. Monitoring the target virtual machine may also include monitoring of physical or virtual hardware components, such as, for example, a dedicated interface port of a physical or virtual network device through which network traffic transmitted from or to the target virtual machine flows. Hereinafter, such components are referred to as "target components".

Monitoring the target virtual machine may aim at troubleshooting any types of issues associated with the execution of the target virtual machine. To this end, monitoring the target virtual machine may involve monitoring an activity or a property of one or more of the target components to be monitored. Such activity or property may include a current resource utilization of the monitored component, such as, for example, in the case of the target virtual machine, its current processor, memory and/or network utilization. In the case of monitoring a dedicated port of a network device, for example, such activity or property may include a current bandwidth usage at the port or the currently flowing network traffic itself.

For the purpose of the present disclosure, the term "target computing unit" denotes the computing unit on which the target virtual machine is currently being executed, regardless of whether the target virtual machine is migrated from one computing unit to another. Thus, in case the target virtual machine is migrated from a first computing unit to a second computing unit, the term "target computing unit" denotes the first computing unit at a time before the migration is executed and denotes the second computing unit at a time after the migration is executed.

Further, the term "load imposed on the target computing unit" may denote any type of load that is either directly or indirectly associated with the execution of any virtual machine executing on the target computing unit. Such load may, for example, include a processor, memory and/or network utilization by virtual machines executing on the computing unit. The load imposed on the target computing unit may further include, however, any type of load external to the target computing unit, such as, for example, a network bandwidth usage at a dedicated port of a network device through which network traffic transmitted from or to the target computing unit flows. Such type of load may be called to be "indirectly" associated with the execution of the target computing unit.

The request to monitor the target virtual machine (step (a)) may include any appropriate trigger to initiate the monitoring activity. For example, the request to monitor the target virtual machine may be triggered manually by an operator present at the data center. The request may also be triggered automatically by a data center infrastructure control unit that is configured to manage and control the data center infrastructure. Upon receiving the request to monitor the target virtual machine, the method steps described below are performed. These steps are generally directed to migrating one or more virtual machines being executed on one or more computing units hosted in the data center so as to reduce the load imposed on the target computing unit before the actual monitoring begins.

First, a current allocation of one or more virtual machines to one or more computing units hosted in the data center is identified (step (b)). The current allocation indicates which of the one or more virtual machines is currently being executed on which computing unit hosted in the data center. The current allocation may include those virtual machines which, if migrated, may contribute to reducing the load imposed on the target computing unit.

Next, an enhanced allocation of the one or more virtual machines to one or more computing units hosted in the data center is determined (step (c)). The enhanced allocation is determined in a manner that reduces the load imposed on the target computing unit as compared to the load imposed on the target computing unit under the current allocation. The "one or more computing units" to which the "one or more virtual machines" are allocated under the enhanced allocation may be the same or different computing units as the one or more computing units to which the one or more virtual machines are allocated under the current allocation. Among these one or more virtual machines, some virtual machines may be allocated to the same computing units in the current and in the enhanced allocation and other virtual machines may be allocated to different computing units in the current and in the enhanced allocation.

Further, the one or more virtual machines are migrated so as to reallocate the one or more virtual machines from the current allocation to the enhanced allocation (step (d)). In other words, the one or more virtual machines are migrated so as to effectively implement the enhanced allocation, i.e., a reallocation of the one or more virtual machines is implemented by migrating them accordingly. Thus, those virtual machines among the one or more virtual machines which are allocated to computing units in the enhanced allocation that are different from the computing units to which the respective virtual machines are allocated under the current allocation are migrated from the respective computing units under the current allocation to the respective computing units under the enhanced allocation. Migration may be performed on the one or more virtual machines no matter whether they are in executing, suspended or shutdown state.

Finally, upon completion of the migration of the one or more virtual machines, monitoring of the target virtual machine may begin (step (e)). By migrating the one or more virtual machines in the above-described manner before actually beginning to monitor the target virtual machine, potential overloads imposed on the target computing unit may be avoided. A sufficient load reduction on the target computing unit may be achieved in this way which eventually may prevent unwanted application behavior, service level degradation or other potential malfunction when monitoring is being carried out.

In one implementation, an estimated load imposed on the target computing unit that is attributed to monitoring the target virtual machine may be taken into account. In this regard, the method may further comprise identifying the load imposed on the target computing unit under the current allocation (hereinafter denoted as "current load") and determining an estimated load imposed on the target computing unit attributed to monitoring the target virtual machine (hereinafter denoted as "estimated load"). The enhanced allocation may then be determined in a manner that reduces the load imposed on the target computing unit to such an extent that the sum of the current load and the estimated load do not exceed a load limit. The load limit may be a physical limit given by one or more of the target components to be monitored or the load limit may be a predetermined threshold which may be selected to range below such physical limit, but is not limited thereto. If the target component is the target computing unit, the load limit may be given by the maximum physical memory available at the target computing unit, for example. If the target component is a dedicated port of a network device, the load limit may be given by the maximum bandwidth available at this port. By thereby keeping the load imposed on the target computing unit below a manageable limit, overloads are reliably prevented and, accordingly, unwanted application behavior, service level degradation or other potential malfunction are safely avoided.

In some cases, it may turn out that migrating the one or more virtual machines is not even necessary because a manageable load limit (defined as above) will not be exceeded when monitoring the target virtual machine is actually performed. To this end, monitoring the target virtual machine may be performed without migration of any virtual machine if the sum of the current load and the estimated load does not exceed the load limit. Among the above steps (b) to (e), at least step (d) may be to omitted in this case. In other words, the step of migrating the one or more virtual machines may be performed only if the sum of the current load and the estimated load exceeds the load limit. In such a case, sufficient resources are available to the target computing unit so that there is no risk of an overload arising from the extra load attributed to performing the monitoring itself.

In one possible implementation, the "one or more virtual machines" (being subject to the current and the enhanced allocation) may include the target virtual machine and, in another possible implementation, the one or more virtual machines may not include the target virtual machine. In case the one or more virtual machines include the target virtual machine, the target virtual machine may be migrated to another target computing unit. In one such variant, the target virtual machine may be the only virtual machine among the one or more virtual machines that is being migrated. This may be favorable when solely migrating the target virtual machine entails the least migration effort. On the other hand, in case the one or more virtual machines do not include the target virtual machine, the target virtual machine will not be migrated and remain at the same target computing unit. This may be favorable when it is important to leave the target virtual machine untouched, i.e., for example, when the target virtual machine needs to be monitored in its exact current state. In this case, only other virtual machines may be migrated from the target computing unit away, thus, potentially reducing the load imposed on the target computing unit.

In determining the enhanced allocation, the target computing unit may be blocked against allocation of virtual machines which are not allocated to the target computing unit in the enhanced allocation. This prevents from increasing the load imposed on the target computing unit in the enhanced allocation caused by other mechanisms that may decide to allocate virtual machines, such as, for example, load balancing management functions performed through a data center infrastructure management system. In the same respect, the aggregated load imposed by virtual machines allocated to the target computing unit in the enhanced allocation may be reduced, so that the aggregated load imposed by virtual machines allocated to the target computing unit in the enhanced allocation is less than the aggregated load imposed by virtual machines allocated to the target computing unit in the current allocation.

Also, the target computing unit may be blocked against allocation of virtual machines which are not allocated to the target computing unit in the enhanced allocation while monitoring the target virtual machine is performed. This may be true for allocations caused by other mechanisms, such as, for example, the load balancing management functions referenced above. In this way, it is made sure that, while monitoring the target virtual machine is actually being carried out, the load imposed on the target computing unit will not be increased. Such block may be released once monitoring the target virtual machine has ended. The expression "blocked against allocation of virtual machines" as used herein has the meaning that the target computing unit is prevented from being a destination for migrations or instantiations of new virtual machines.

In order to migrate the one or more virtual machines as described above, migrating the one or more virtual machines may further include determining a migration schedule for reallocating the one or more virtual machines from the current allocation to the enhanced allocation and, thereafter, migrating the one or more virtual machines according to the migration schedule. The migration schedule itself may include a list of migration entries, wherein each entry comprises data identifying a virtual machine to be migrated, data identifying an originating computing unit hosted in the data center, and data identifying a destination computing unit hosted in the data center. The migration schedule may be processed by stepwise executing the migration entries included in the list of migration entries. A plurality of migrations according to a plurality of migration entries in the list of migration entries may also be executed in parallel.

In one particular implementation, monitoring the target virtual machine may include mirroring network traffic at a mirror-from port of a target switch, wherein at least a part of the network traffic passing through said port is duplicated by the mirroring and imposes an additional load on the port towards which the network traffic is mirrored. In this case, the mirror-from port represents a "target component" as defined above. This implementation is specifically directed to monitoring network activity associated with the target virtual machine. For example, a server application being executed on the target virtual machine may send and receive network traffic to and from client applications residing on other virtual machines in the data center. For troubleshooting purposes of the server application, monitoring and analyzing the network traffic transmitted from or to the server application may be of interest.

"Mirroring" is a key technique well-known for troubleshooting network based applications. Mirroring network traffic may involve copying the data packets or frames included in the network traffic and sending these copies to a destination, where the mirrored network traffic may be collected and analyzed, for example, by means of protocol analysis applications, such as Wireshark® or the like. The destination may be a terminal used by an operator of the data center, for example, but is not limited thereto. Mirroring of network traffic may generate significant additional throughput on network interfaces provided in the data center, more precisely on those network interfaces which form part of the path on which the mirrored network traffic flows. A problem may particularly arise when bandwidth limits of one or more of such interface ports are exceeded. For example, a maximum data rate of 100 Mb/s may be available at a Fast Ethernet port and 1000 Mb/s at a Gigabit Ethernet port. Exceeding these limits may lead to loss of data packets or frames because excess packets or frames may be dropped at these ports. This may inevitably lead to unwanted application behavior, service level degradation or other types of malfunction as well as incomplete mirroring. Thus, this implementation is specifically directed to avoiding communication path bottlenecks due to additional network traffic caused by mirroring.

In one variant of this implementation, the target switch may be a virtual switch provided at the target computing unit, wherein the target switch comprises a mirror-to port. The mirror-to port is a port towards which network traffic ingressing or egressing the target virtual machine is mirrored. The virtual switch may be provided as a software component at the target computing unit which provides at least one virtual port towards the target virtual machine. The target switch may likewise provide additional virtual ports to other virtual machines being executed on the target computing unit. Also, the target switch may provide connectivity to at least one physical port to which network traffic transmitted to or from the target virtual machine may be forwarded. Such physical port may be a physical port provided at the target computing unit, such as a port of a network interface card (NIC) installed therein. Therefore, if the target switch is a virtual switch, the mirror-to port may be such a virtual port or a physical port towards which network traffic transmitted to or from the target virtual machine is mirrored.

In another variant of this implementation, the target switch may be a physical switch provided in the data center, wherein the mirror-to port is a physical port to which network traffic transmitted to or from the target virtual machine is mirrored. Similar to the virtual switch described above, such physical switch forms part of the path on which the network traffic being transmitted to or from the target virtual machine flows. Such physical switch may, for example, be a central data center switch to which the target computing unit is connected.

In either variant, i.e., in case the target switch is either a virtual switch or a physical switch, the target switch may be configured to mirror network traffic flowing through the mirror-from port in either direction, i.e., ingress and egress traffic, or in just one of these directions. The target switch may comprise additional ports which may be configured to mirror network traffic in the same manner. Further, the target switch may comprise a measurement component which may be configured to measure the volume of the network traffic flowing at the mirror-from port, for example, by counting the number of data packets or frames transferred through the mirror-from port or measuring the current average data rate present at the mirror-from port.

In a variant of the above implementation, the enhanced allocation may be determined in a manner that avoids that the maximum bandwidth available at one or more ports of one or more switches provided in the data center is exceeded. The one or more ports of the one or more switches referenced here may include the mirror-from port and the target switch, but are not limited thereto. In fact, although migrating the one or more virtual machines is directed to avoiding an overload imposed on the target computing unit, as discussed above, the enhanced allocation may—in extension of this—also be determined in a manner that prevents similar overloads throughout the entire data center.

To this end, the enhanced allocation may be determined on the basis of at least one of a current average bandwidth usage measured at one or more ports of one or more switches provided in the data center, a maximum bandwidth available at the one or more ports of the one or more switches provided in the data center, and an estimated bandwidth usage attributed to the network traffic to be mirrored. The "one or more ports of the one or more switches" referred to here may be any ports or switches, both either virtual or physical, provided in the data center that may be affected by migrating the one or more virtual machines according to the enhanced allocation, i.e., any ports or switches whose loads may change when the migrations are executed. The one or more ports of the one or more switches may, for example, comprise only those ports of those switches which form part of the path on which the network traffic transmitted to or from the target virtual machine flows. Also, the one or more ports of the one or more switches may, for example, only be given by one or more ports of the target switch.

Since the enhanced allocation is determined at a time at which mirroring the network traffic has not yet started, the bandwidth usage attributed to the network traffic to be mirrored can only be estimated. In one variant, the network traffic to be mirrored may be estimated based on prior measurements at the mirror-from port. Prior measurements at the mirror-from port may represent an authentic estimation of the network traffic to be mirrored when the previously measured network traffic is estimated to be duplicated. By considering the estimated bandwidth usage attributed to the network traffic to the mirrored, potential bottlenecks may be identified in the path on which the mirrored network traffic will flow later on and possibly be avoided by determining the enhanced allocation accordingly.

In a further variant of the above implementation, the enhanced allocation may be determined under the constraint that a maximum bandwidth available at each of the mirror-from port and the one or more ports of the one or more switches provided in the data center (as defined above) is not exceeded. Using such enhanced allocation, any overloads caused by the additional load of mirroring may be avoided throughout the data center.

In an implementation of the monitoring control unit referenced above, the monitoring control unit may delegate one or more of its tasks executed by one or more of its components (a) to (e). For example, the identifying component may be configured to identify the current allocation of the one or more virtual machines by instructing an infrastructure control unit provided in the data center to identify the current allocation. The actual task of identifying the current allocation is then carried out by the infrastructure control unit and the allocation thus identified is returned to the identifying component. Similarly, the migrating component may be configured to migrate the one or more virtual machines by instructing the infrastructure control unit to migrate the one or more virtual machines so as to reallocate the one or more virtual machines from the current allocation to the enhanced allocation. It is understood, that such delegation of the identifying component (b) and the migrating component (d) is merely exemplary. Similar delegations may be also implemented for the components (a), (c) and (e) in the same manner.

In the following description, for purposes of explanation and not limitation, specific details are set forth in order to provide a thorough understanding of the present disclosure. It will be apparent to one skilled in the art that the present disclosure may be practiced in other implementations that depart from the specific details. Those skilled in the art will further appreciate that functions explained herein below may be implemented using individual hardware circuitry, using software functioning in conjunction with a programmed microprocessor or a general purpose computer. It will also appreciated that when the present disclosure is described as a method, it may also be embodied in a device (i.e., the monitoring control unit and/or the infrastructure control unit described herein below), a computer processor and a memory coupled to a processor, wherein the memory is encoded with one or more programs that perform the methods disclosed herein when executed by the processor.

Figure 1:
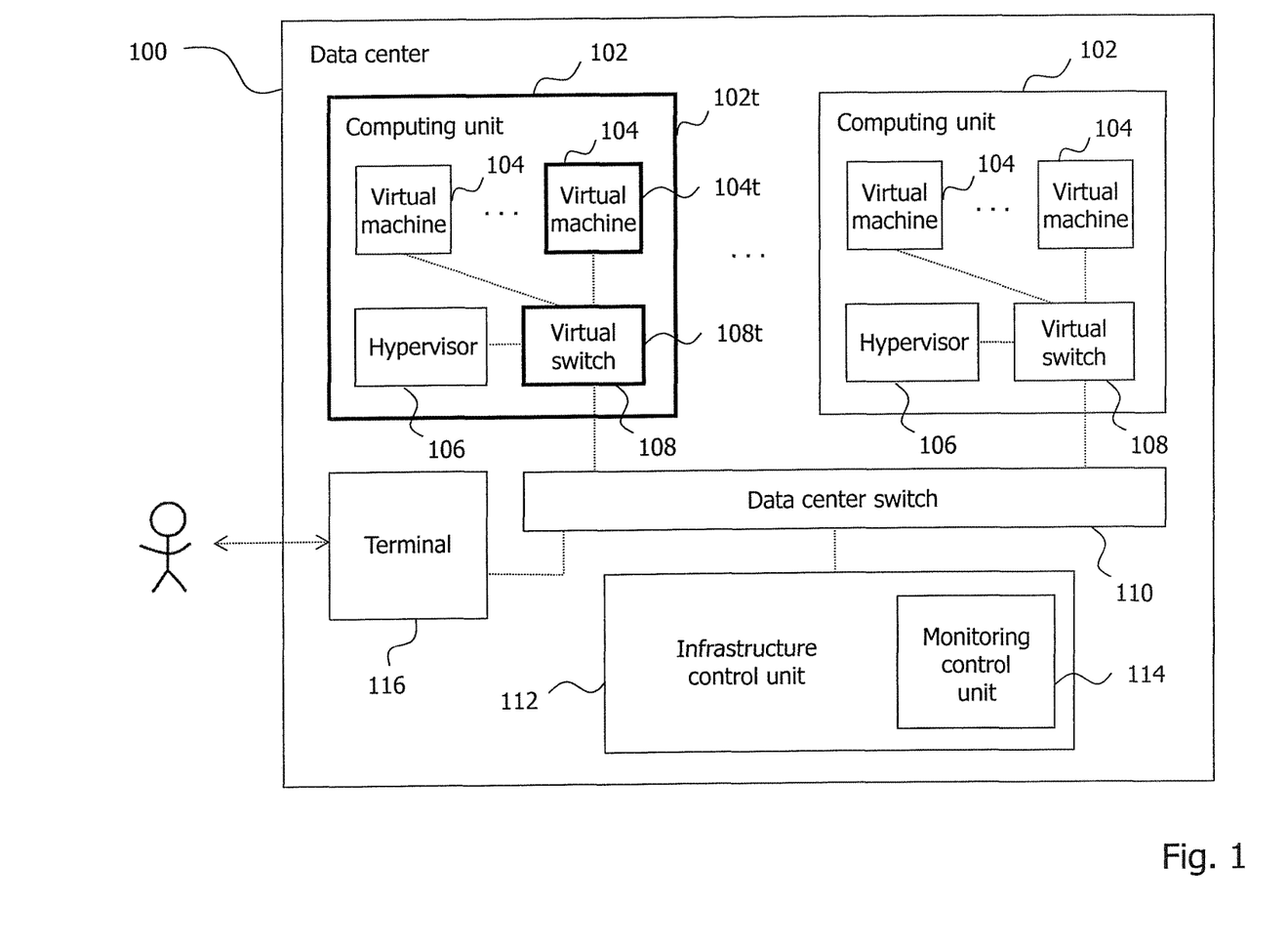
FIG. 1 schematically illustrates the composition of a data center.

FIG. 1 schematically illustrates an exemplary composition of a data center 100 which comprises a plurality of computing units 102. Each computing unit 102 hosts a plurality of virtual machines 104 which may be in executing, suspended or shutdown state. Each virtual machine 104 may access the resources of the underlying computing unit 102 through a hypervisor 106 so that several virtual machines 104 may share the physical resources of the same computing unit 102, e.g., its processor, memory and/or network interfaces. For each computing unit 102, allocation of the physical resources is managed by a hypervisor 106 which may assign dedicated portions of the available physical resources to the virtual machines 104 being executed thereon. On each computing unit 102, a virtual switch 108 is provided (as a software component, for example) which provides virtual network ports 118 (shown in FIG. 2) towards the virtual machines 104. A virtual switch 108 also provides connectivity to physical network ports 120 (shown in FIG. 2) of the respective computing unit 102. In the example of FIG. 1, the virtual switches 108 are connected via one or more of their physical ports 120 to a central data center switch 110, which may be used to establish network connectivity among the computing units 102, the virtual machines 104 and other entities hosted inside or outside the data center.

Further, an infrastructure control unit 112 configured to manage and control the allocation of virtual machines 104 to the computing units 102 is provided. The infrastructure control unit 112 is responsible for instantiating virtual machines, terminating virtual machines and migrating virtual machines on and between the different computing units 102, for example. The infrastructure control unit 112 comprises a monitoring control unit 114 which extends the functionality of the infrastructure control unit 112 with respect to the capability to monitor virtual machines as described in the present disclosure. The infrastructure control unit 112 is connected to the data center switch 110 and may thus establish network connectivity to the computing units 102 and the virtual machines 104 in order to perform its tasks, such as instantiating, terminating, or migrating the virtual machines 104. Also, the infrastructure control unit 112 has connectivity to the hypervisors 106 from which it may collect information on the physical resources available at the different computing units 102. The infrastructure control units 112 may use this information to decide on how the virtual machines 104 should be allocated to the computing units 102.

Moreover, a terminal 116 is provided in the data center 100 which is connected to the data center switch 110 and which is thereby able to establish network connectivity to the infrastructure control unit 112. The terminal 116 may be used by an operator present at the data center 100, for example, in order to access the infrastructure control unit 112 (including the monitoring control unit 114) so as to control the monitoring of virtual machines 104 according to the present disclosure.

Figure 2:
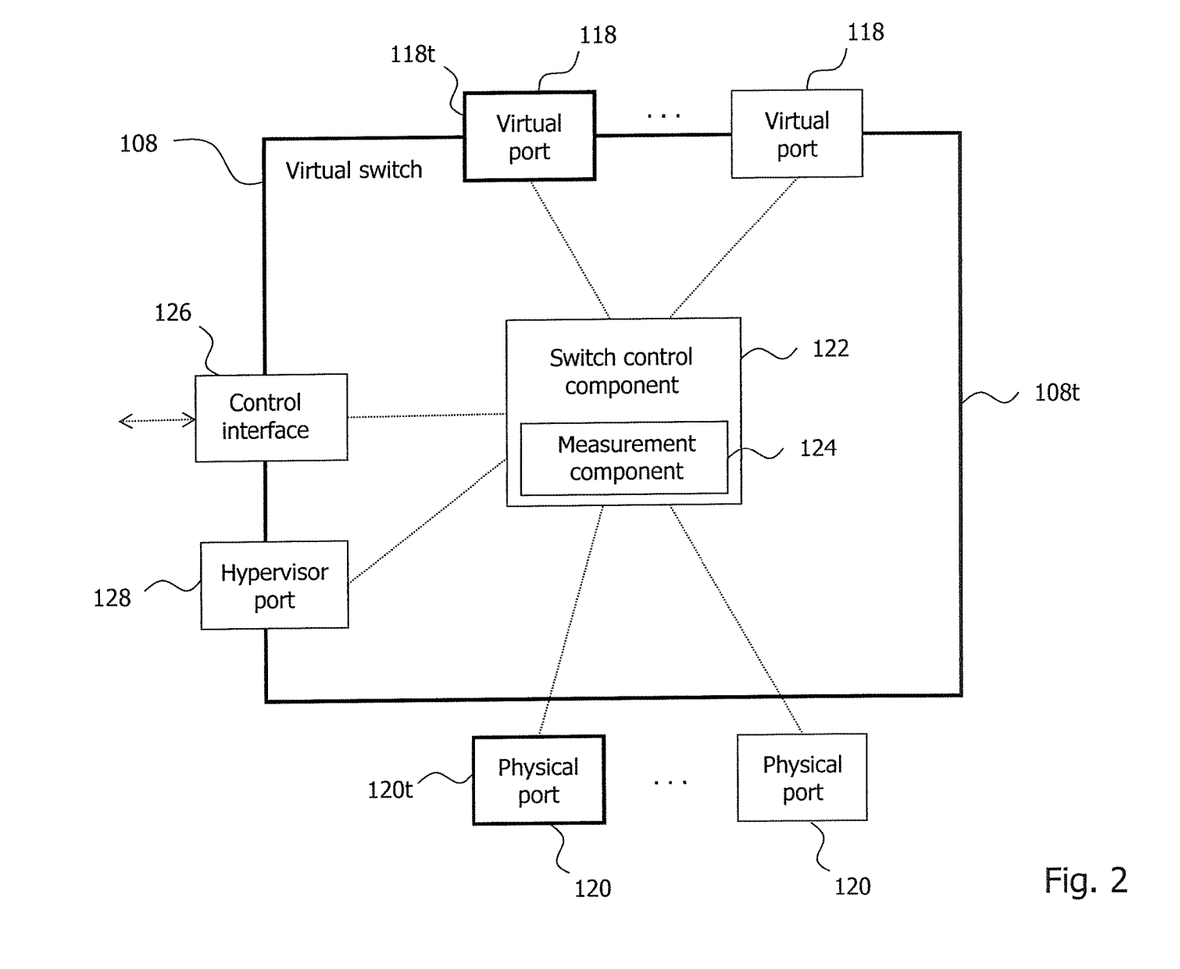
FIG. 2 schematically illustrates the composition of a virtual switch provided at a computing unit hosted in the data center of FIG. 1.

FIG. 2 schematically illustrates the composition of a virtual switch 108 in more detail. The virtual switch 108 shown here comprises one or more virtual ports 118 which may be used by the virtual machines 104 being executed on the respective underlying computing unit 102 to establish network connectivity. Further, the virtual switch 108 may be connected to one or more physical ports 120 which may be interface ports of one or more physical network interface cards (NICs) installed at the respective computing unit 102. The virtual switch 108 further comprises a switch control component 122 which is configured to perform data frame switching between the one or more virtual ports 118 and the one or more physical ports 120. The switching control component 122 may further be configured to mirror network traffic flowing through one or more of the virtual ports 118 and/or one or more of the physical ports 120. The switching control component 122 may be configured to send the mirrored network traffic towards a configurable destination which may be a receiving application provided at the terminal 116, for example, that collects the received traffic. The received mirrored network traffic may then be processed by analysis tools, such as Wireshark®, for trouble-shooting or other monitoring purposes.

The switch control component 122 further comprises a measurement component 124 that is configured to measure the volume of the network traffic flowing through one or more of the virtual ports 118 and/or one or more of the physical ports 120. Measuring the volume of the network traffic may include counting the number of data packets or frames transferred through the measured port and/or calculating the current average data rate present at the measured port. Further, the virtual switch 108 comprises a control interface 126 which may be used—for example by the infrastructure control unit 112 and/or the monitoring control unit 114—to control the switch control component 122 including the measurement component 124. Particularly, the control interface 126 may be used to enable mirroring of the network traffic present at one or more of the virtual and/or physical ports 118 and 120. Finally, the virtual switch 108 comprises a hypervisor port 128 which is a virtual port specifically dedicated to connecting a hypervisor 106 to the virtual switch 108.

Figure 3A:
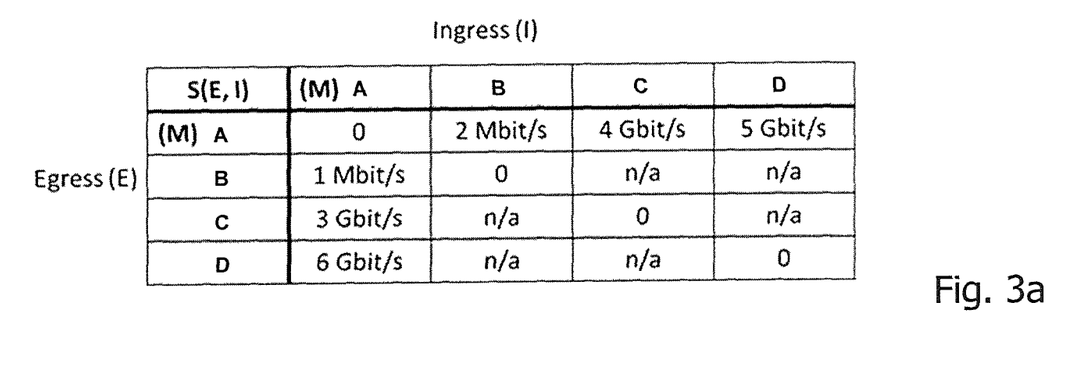
FIGS. 3a to 3c illustrate an exemplary ingress/egress matrix of a virtual switch.
Figure 3B:
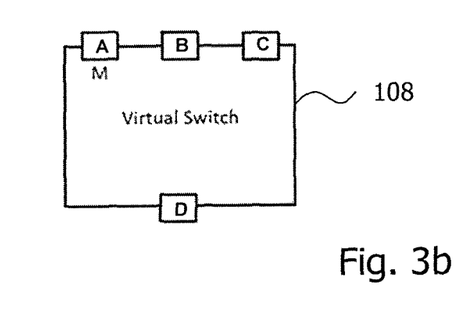
Figure 3C:
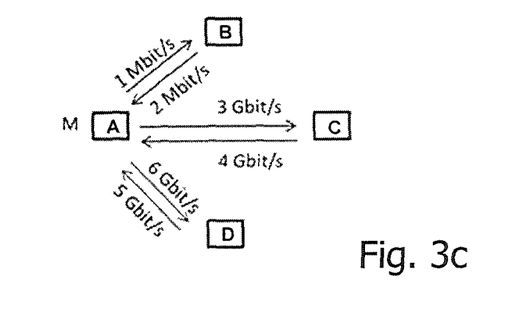

An example of measurements carried out by the measurement component 124 is illustrated in FIGS. 3a to 3c. Here, an exemplary virtual switch 108 is shown in FIG. 3b and a corresponding ingress/egress matrix is shown in FIG. 3a. The exemplary virtual switch 108 comprises three virtual ports indicated by letters A, B and C and a physical port indicated by letter D. FIG. 3c shows the data rates of corresponding network traffic flowing between the respective ports A through D, wherein port A is the port that is to be monitored. As regards the network traffic flowing between ports A and B, an egress data rate of 1 Mb/s and an ingress data rate of 2 Mb/s is measured in the given example. As regards the network traffic flowing between ports A and C, an egress data rate of 3 Gb/s and an ingress data rate of 4 Gb/s is measured and, as regards the network traffic flowing between ports A and D, an egress data rate of 6 Gb/s and an ingress data rate of 5 Gb/s is measured. The respective measurement results are compiled to the ingress/egress matrix depicted in FIG. 3a.

Figure 4:
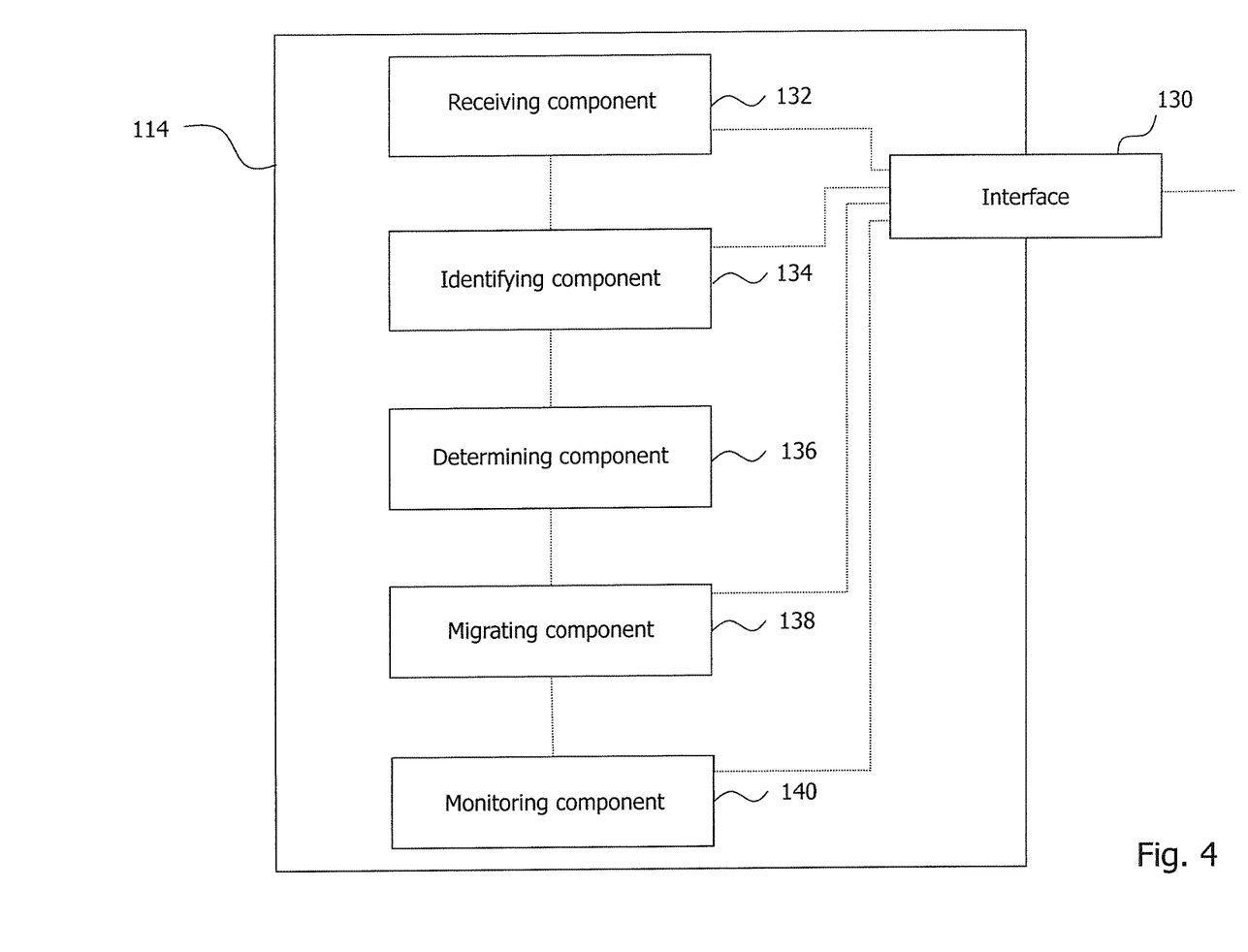
FIG. 4 schematically illustrates the composition of a monitoring control unit provided in the data center of FIG. 1.
Figure 5:
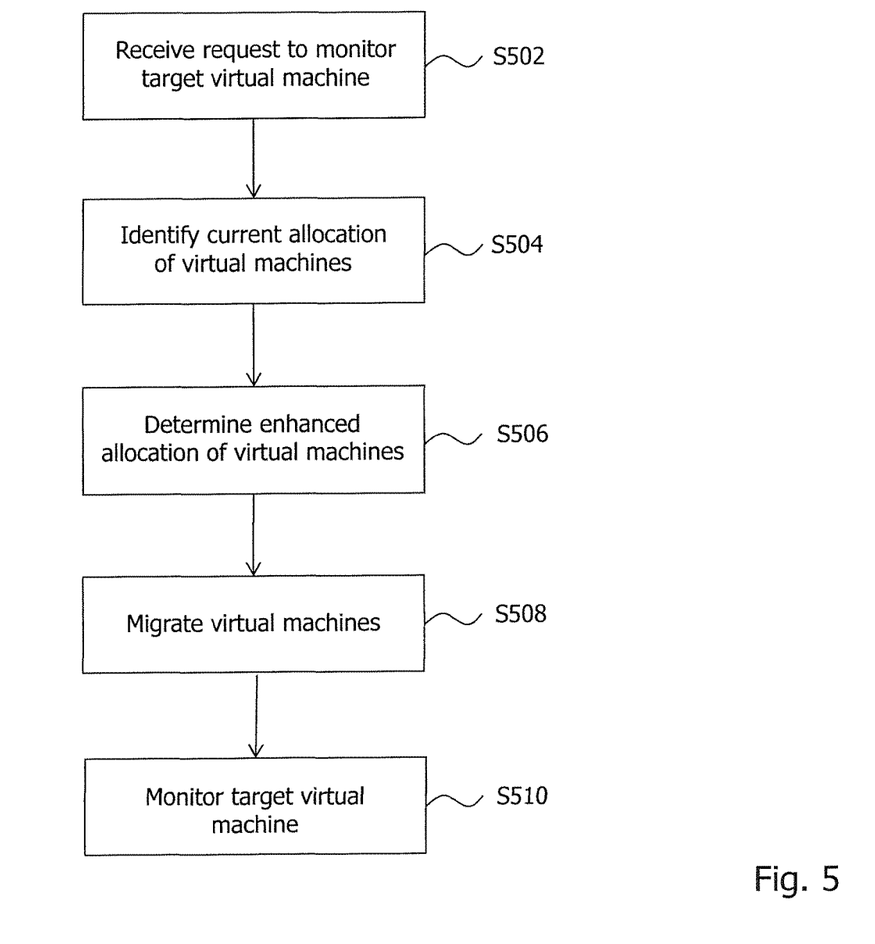
FIG. 5 schematically illustrates a flowchart of a method which may be performed by the monitoring control unit of FIG. 4.

FIG. 4 schematically illustrates a composition of the monitoring control unit 114 in more detail and FIG. 5 schematically illustrates a corresponding flowchart of a method which may be performed by the monitoring control unit 114. The basic operation of the monitoring control unit 114 will in the following be described with reference to both FIGS. 4 and 5.

The monitoring control unit 114 comprises an interface 130. The interface 130 may be configured as an interface towards the infrastructure control unit 112 which may be used by the monitoring control unit 114 to access the functions provided by the infrastructure control unit 112 and, vice versa, which may be used by the infrastructure control unit 112 to access the functions provided by the monitoring control unit 114. Alternatively or additionally, the interface 130 may be configured as one or more respective interfaces between the components 132 to 140, respectively.

Further, the monitoring control unit 114 comprises a receiving component 132 configured to receive, in step S502, a request to monitor a target virtual machine executed on a target computing unit hosted in the data center. For the purpose of illustration, an exemplary target virtual machine is denoted by reference numeral 104t and is indicated by bold lines in FIG. 1. The corresponding target computing unit is denoted by reference numeral 102t and is indicated by bold lines in FIG. 1 as well. The receiving component 132 receives the request to monitor the target virtual machine 104t via the interface 130. Further, the receiving component 132 may instruct the infrastructure control unit 112 via the interface 130 to block or unblock the target computing host 102t against allocation of virtual machines 104.

Moreover, the monitoring control unit 114 comprises an identifying component 134 configured to identify, in step S504, a current allocation of one or more virtual machines 104 to one or more computing units 102 hosted in the data center. In the present example, the identifying component 134 delegates this task to the infrastructure control unit 112 and instructs the infrastructure control unit 112 via the interface 130 to identify the current allocation. The infrastructure control unit 112, in turn, identifies the current allocation and returns the result via the interface 130 to the identifying component 134. The identifying component 134 may in the same manner identify the load imposed on the target computing unit 102t under the current allocation by instructing the infrastructure control unit 112 via the interface 130 to identify the current load imposed on the target computing unit 102t. The infrastructure control unit 112, in turn, may return the result via the interface 130 to the identifying component 134.

For exemplary purposes, it is further assumed that the request to monitor the target virtual machine 104t received by the receiving component 132 more specifically defines to monitor the target virtual machine 104t by mirroring the network traffic flowing at the mirror-from port 118t (indicated by bold lines in FIG. 2) of the target virtual switch 108t (indicated by bold lines in FIGS. 1 and 2). The "load imposed on the target computing unit 102t" is in this case given by the volume of the network traffic measured at the mirror-from port 118t. The identifying component 134 may further be configured to identify and collect data including the current average bandwidth usage measured at one or more ports of one or more switches provided in the data center, a maximum bandwidth available at the one or more ports of the one or more switches, and an estimated bandwidth usage attributed to the network traffic to be mirrored. The network traffic to be mirrored may be estimated based on prior measurements at the mirror-from port 118t, for example, by estimating the previously measured network traffic at the mirror-from port 118t to be duplicated. Here again, the identifying component 134 may identify and collect this data by instructing the infrastructure control unit 112 via the interface 130 to identify and collect this data. The infrastructure control unit 112, in turn, may return the result via the interface 130 to the identifying component 134.

The monitoring control unit 114 further comprises a determining component 136 configured to determine, in step S506, an enhanced allocation of the one or more virtual machines 104 to one or more computing units 102 hosted in the data center. The enhanced allocation is determined in a manner that reduces the load imposed on the target computing unit 102t compared to the load imposed on the target computing unit 102t under the current allocation.

The determining component 136 receives the above-described identified and collected data from the identifying component 134 and determines, on the basis of this data, the enhanced allocation. In a specific example, the enhanced allocation may be determined on the basis of at least one of the current average bandwidth usage measured at one or more virtual ports 118 of the target switch 108t, the current average bandwidth usage measured at one or more physical ports 120 of the target switch 108t, the maximum bandwidth available at the one or more physical ports 120 of the target switch 108t, and an estimated bandwidth usage attributed to the network traffic to be mirrored. The enhanced allocation may also be determined under the constraint that the maximum bandwidth available at each of the mirror-from port 118t and one or more other ports of one or more other switches provided in the data center is not exceeded. As for determining the enhanced allocation, the target computing unit 102t may be blocked against allocation of virtual machines 104 which are not allocated to the target computing unit 102t in the enhanced allocation. Also, the aggregated load imposed by the virtual machines 104 allocated to the target computing unit 102t in the enhanced allocation may be reduced as compared to the aggregated load imposed by the virtual machines 104 allocated to the target computing unit 102t under the current allocation.

Further, the monitoring control unit 114 comprises a migrating component 138 configured to migrate, in step S508, the one or more virtual machines 104 so as to reallocate the one or more virtual machines 104 from the current allocation to the enhanced allocation. To this end, the migrating component 138 may be configured to determine a migration schedule for reallocating the one or more virtual machines 104 from the current allocation to the enhanced allocation and, accordingly, it may be configured to migrate the one or more virtual machines 104 according to the migration schedule. The migration schedule may include a list of migration entries, each entry comprising data identifying a virtual machine 104 to be migrated, data identifying an originating computing unit 102 and data identifying a destination computing unit 102. The migrating component 138 may migrate the one or more virtual machines 104 by instructing the infrastructure control unit 112 via the interface 130 to migrate the one or more virtual machines 104 so as to reallocate them from the current allocation to the enhanced allocation. The infrastructure control unit 112, in turn, may return a result on the migration performed via the interface 130 to the migrating component 138.

Moreover, the monitoring control unit 114 comprises a monitoring component 140 configured to monitor, in step S510, the target virtual machine 104t upon completion of the migration of the one or more virtual machines 104. More specifically, in the present example, the monitoring component 140 may instruct—via the interface 130 and the infrastructure control unit 112—the switch control component 122 of the target virtual switch 108t to start mirroring the network traffic flowing at the mirror-from port 118t to the mirror-to port 120t (indicated by bold lines in FIG. 2). The switch control component 122 may be configured to send the mirrored network traffic towards the terminal 116, where a receiving application may collect the received traffic. The received mirrored network traffic may then be processed by an analysis tool at the terminal 116, such as Wireshark®, for trouble-shooting or other purposes.

Figure 6:
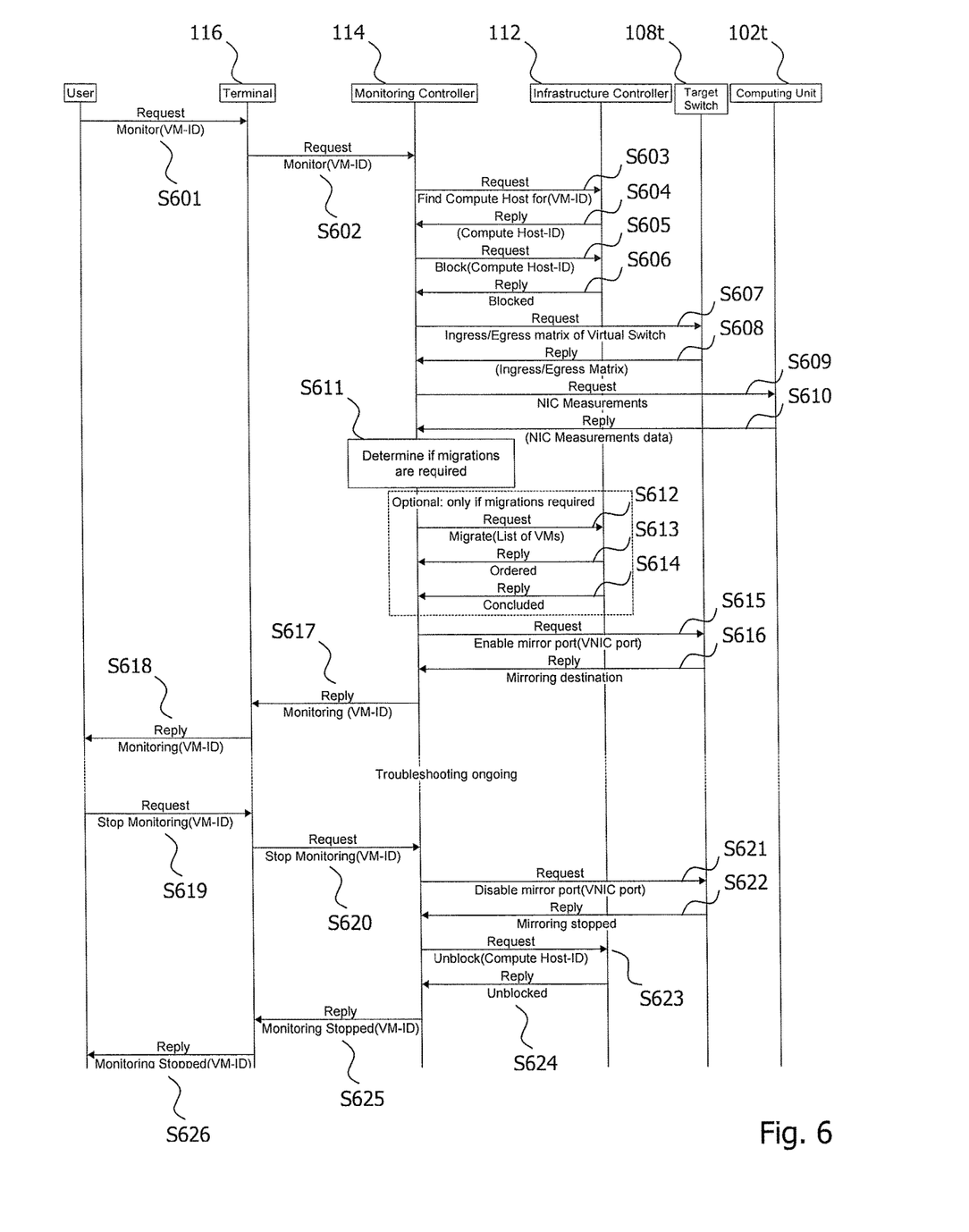
FIG. 6 illustrates a sequence diagram of a method for monitoring a virtual machine in the data center of FIG. 1.

In order to better elucidate certain aspects of the present disclosure, FIG. 6 additionally illustrates a more detailed use case example of a method for monitoring the target virtual machine 104t in the data center 100 in the form of a sequence diagram.

First, a user, such as an operator present at the data center 100, inputs a request to the terminal 116 to monitor the target virtual machine 104t (S601) and the terminal 116, in turn, sends a corresponding request to the monitoring control unit 114 (S602). Thereafter, the monitoring control unit 114 transmits a request to the infrastructure control unit 112 to identify the computing unit that currently executes the target virtual machine 104t, i.e., to identify the target computing unit 102t (S603), the result of which is returned to the monitoring control unit 114 in the form of a computing unit identifier (S604). At this point, the monitoring control unit 114 sends a request to the infrastructure control unit 112 to block the target computing unit 102t to make sure that the infrastructure control unit 112 no longer allocates virtual machines 104 or instantiates new virtual machines 104 to the target computing unit 102t (S605). The infrastructure control unit 112 confirms that the block has been set (S606). For the sake of a better understanding, it is noted that this block does not apply to migrations requested later on by the monitoring control unit 114 itself (see below). The monitoring control unit 114 then requests from the target virtual switch 108t an ingress/egress matrix of the target virtual switch 108t (S607) which is returned to the monitoring control unit 114 accordingly (S608). In the present example, the monitoring control unit 114 additionally requests from the target computing unit 102t measurements of the physical ports of one or more of the network interface cards (NIC) of the target computing unit 102t (S609) which are returned to the monitoring control unit 114 accordingly (S610). As explained above, these measurements of physical NIC ports may also be requested from the target virtual switch 108t, but it will be understood that such information may optionally be requested directly from the target computing unit 102t as well.

The information collected in steps S607 to S610 is then used by the monitoring control unit 114 to determine—in a manner described above—whether migrations are required (S611) before mirroring network traffic at the mirror-from port 118t may commence. If it is determined that migrations are required, the monitoring control unit 114 instructs the infrastructure control unit 112 to migrate one or more virtual machines 104 as described above (S612). The infrastructure control unit 112 sends back a confirmation (S613) and starts executing the requested migrations. Once all migrations are completed, the infrastructure control unit 112 notifies the monitoring control unit 114 of the conclusion of all migrations (S614). Next, the monitoring control unit 114 transmits a request to the target virtual switch 108t to enable mirroring at the mirror-from port 118t (S615). If, on the other hand, it is determined in step S611 that no migrations are required, the monitoring controller 114 may request the target virtual switch 108t to enable mirroring at the mirror-from port 118t immediately without performing any migrations (S615). The target virtual switch 108t confirms to the monitoring control unit 114 that mirroring has commenced (S616). The monitoring control unit 114 sends a corresponding reply to the terminal 116 confirming that monitoring the target virtual machine 104t has started (S617). The terminal 116, in turn, displays a corresponding feedback to the user (S618). The user may then collect and analyze the mirrored network traffic at the terminal 116 while the monitoring activity continues.

In order to terminate monitoring the target virtual machine 104t, the user may input a request to the terminal 116 to stop monitoring (S619). This request is sent by the terminal 116 to the monitoring control unit 114 (S620) which, thereafter, requests the target virtual switch 108t to disable mirroring at the mirror-from port 118t (S621). The target virtual switch 108t, in turn, stops mirroring and notifies the monitoring control unit 114 accordingly (S622). The monitoring control unit 114 then instructs the infrastructure control unit 112 to unblock the target computing unit 102t against allocations of virtual machines 104 (S623) which is confirmed by the infrastructure control unit 112 accordingly (S624). Finally, the monitoring control unit 114 confirms to the terminal 116 that monitoring has been stopped (S625) and the terminal 116, in turn, provides a corresponding feedback to the user (S626).

It will be understood that the composition of the data center 100 and as well as the methods described herein are merely exemplary and not limited to the above-described specific characteristics. In particular, one skilled in the art will appreciate that the specific implementation of the monitoring control unit 114 as a component that extends the functionality of the infrastructure control unit 112 is not obligatory. A monitoring control unit may be realized in any conceivable form that allows performing its tasks according to the present disclosure. The monitoring unit may, for example, be provided as a separate computing unit which communicates with the infrastructure control unit via a network. The monitoring control unit may also be realized in the form of a virtual machine itself, for example. Also, there is no need that the monitoring unit relies on functions provided by an infrastructure control unit. Rather, the monitoring control unit may be provided as a standalone unit that supports all functions described in the present disclosure, including those which are exemplarily described with regard to the infrastructure control unit. Further, one skilled in the art will appreciate that the present disclosure refers to virtual machines as an example of virtualization technology only, but is not limited thereto. Rather, one skilled in the art will appreciate that the present disclosure may be embodied in combination with other virtualization concepts of similar nature as well, such as, for example, Linux containers or the like. Similarly, one skilled in the art will appreciate that the present disclosure refers to switches as an example of network technology employed only, but is not limited thereto. Rather, one skilled in the art will appreciate that the present disclosure may be embodied in combination with any other network devices of similar nature, such as bridges or the like.

The invention claimed is:

1. A method for monitoring virtual machines in a data center hosting one or more computing units, and preventing service level degradation due to an excessive load imposed on the one or more computing units by the monitoring, the method comprising:
   receiving, by a monitoring control unit, through an interface of the monitoring control unit, a request to monitor an activity of a target virtual machine of one or more virtual machines executed on a target computing unit of the one or more computing units hosted in the data center, wherein the activity includes a current average bandwidth usage measured at one or more ports of one or more switches, provided in the data center, that are associated with the target computing unit and are used by the target virtual machine;
   identifying, by the monitoring control unit, a current allocation of the one or more virtual machines to the one or more computing units hosted in the data center;
   identifying, by the monitoring control unit, a load imposed by the activity on the target computing unit under the current allocation;
   determining, by the monitoring control unit, an estimated load imposed on the target computing unit attributed to the requested monitoring of the activity of the target virtual machine;
   determining, by the monitoring control unit, an enhanced allocation of the one or more virtual machines to the one or more computing units hosted in the data center in response to the receiving the request and in response to a sum of the load imposed on the target computing unit under the current allocation and the estimated load attributed to the requested monitoring exceeding a load limit, such that a sum of an estimated load imposed on the target computing unit under the enhanced allocation and the estimated load attributed to the requested monitoring is below the load limit, wherein the estimated load imposed on the target computing unit under the enhanced allocation is estimated based on prior measurements of load at a mirror-from port of a target switch of the one or more switches that are associated with the target computing unit, and wherein the enhanced allocation is determined based on an estimated bandwidth usage attributed to network traffic;
   migrating, by the monitoring control unit, a subset of the one or more virtual machines so as to reallocate the one or more virtual machines from the current allocation to the enhanced allocation; and
   monitoring, by the monitoring control unit, the activity of the target virtual machine upon completion of the migration of the subset of the one or more virtual machines, and providing feedback including the monitored activity of the target virtual machine to a terminal, wherein the migrating the subset of the one or more virtual machines before the monitoring results in the load reduction on the target computing unit below the load limit, thereby preventing service level degradation when the monitoring is performed in the data center.

2. The method of claim 1, wherein, at least the step of migrating the subset of the one or more virtual machines is performed only if the sum of the load imposed on the target computing unit under the current allocation and the estimated load attributed to the requested monitoring exceeds the load limit.

3. The method of claim 1, wherein the migrated subset of the one or more virtual machines does not include the target virtual machine.

4. The method of claim 1, wherein, in the determining the enhanced allocation, the target computing unit is blocked against allocation of virtual machines which are not allocated to the target computing unit in the enhanced allocation, and wherein the blocking of the target computing unit against the allocation of virtual machines comprises preventing the target computing unit from being a destination for migrations of new virtual machines.

5. The method of claim 1, wherein an aggregated load imposed by virtual machines allocated to the target computing unit in the enhanced allocation is less than an aggregated load imposed by virtual machines allocated to the target computing unit in the current allocation.

6. The method of claim 1, wherein the target computing unit is blocked against allocation of virtual machines which are not allocated to the target computing unit in the enhanced allocation while monitoring the activity of the target virtual machine.

7. The method of claim 1, wherein the migrating the subset of the one or more virtual machines comprises:
   determining, by the monitoring control unit, a migration schedule for reallocating the subset of the one or more virtual machines from the current allocation to the enhanced allocation; and
   migrating, by the monitoring control unit, the subset of the one or more virtual machines according to the migration schedule.

8. The method of claim 7, wherein the migration schedule includes a list of migration entries, each migration entry comprising data identifying a virtual machine to be migrated, data identifying an originating computing unit hosted in the data center, and data identifying a destination computing unit hosted in the data center.

9. The method of claim 1, wherein the monitoring the activity of the target virtual machine comprises mirroring the network traffic at the mirror-from port of the target switch.

10. The method of claim 9, wherein the load imposed on the target computing unit comprises a volume of the network traffic measured at the mirror-from port.

11. The method of claim 9:
   wherein the target switch is a virtual switch provided at the target computing unit; and
   wherein the target switch comprises a mirror-to port, the mirror-to port being a virtual or physical port towards which network traffic, ingressing or egressing the target virtual machine, is mirrored.

12. The method of claim 9:
wherein the target switch is a physical switch provided in the data center; and
wherein the target switch comprises a mirror-to port, the mirror-to port being a physical port towards which network traffic, ingressing or egressing the target virtual machine, is mirrored.

13. The method of claim 1, wherein the enhanced allocation is further determined based on at least one of:
the current average bandwidth usage measured at the one or more ports of the one or more switches provided in the data center; and
a maximum bandwidth available at the one or more ports of the one or more switches provided in the data center.

14. The method of claim 9, wherein the network traffic is estimated based on the prior measurements at the mirror-from port.

15. The method of claim 13, wherein the enhanced allocation is determined under a constraint that a maximum bandwidth available at each of the mirror-from port and the one or more ports of the one or more switches provided in the data center is not exceeded.

16. A non-transitory computer readable recording medium storing a computer program product for monitoring virtual machines in a data center hosting one or more computing units, and preventing service level degradation due to an excessive load imposed on the one or more computing units by the monitoring, the computer program product comprising software instructions which, when run on processing circuitry of the data center, causes the data center to:
receive, by a monitoring control unit, through an interface of the monitoring control unit, a request to monitor an activity of a target virtual machine of one or more virtual machines executed on a target computing unit of the one or more computing units hosted in the data center, wherein the activity includes a current average bandwidth usage measured at one or more ports of one or more switches, provided in the data center, that are associated with the target computing unit and are used by the target virtual machine;
identify, by the monitoring control unit, a current allocation of the one or more virtual machines to the one or more computing units hosted in the data center;
identify, by the monitoring control unit, a load imposed by the activity on the target computing unit under the current allocation;
determine, by the monitoring control unit, an estimated load imposed on the target computing unit attributed to the requested monitoring of the activity of the target virtual machine;
determine, by the monitoring control unit, an enhanced allocation of the one or more virtual machines to the one or more computing units hosted in the data center in response to the reception of the request and in response to a sum of the load imposed on the target computing unit under the current allocation and the estimated load attributed to the requested monitoring exceeding a load limit, such that a sum of an estimated load imposed on the target computing unit under the enhanced allocation and the estimated load attributed to the requested monitoring is below the load limit, wherein the estimated load imposed on the target computing unit under the enhanced allocation is estimated based on prior measurements of load at a mirror-from port of a target switch of the one or more switches that are associated with the target computing unit, and wherein the enhanced allocation is determined based on an estimated bandwidth usage attributed to network traffic;
migrate, by the monitoring control unit, a subset of the one or more virtual machines so as to reallocate the one or more virtual machines from the current allocation to the enhanced allocation; and
monitor, by the monitoring control unit, the activity of the target virtual machine upon completion of the migration of the subset of the one or more virtual machines, and providing feedback including the monitored activity of the target virtual machine to a terminal, wherein the migration of the subset of the one or more virtual machines before the monitoring results in the load reduction on the target computing unit below the load limit, thereby preventing service level degradation when the monitoring is performed in the data center.

17. A monitoring control unit for monitoring virtual machines in a data center hosting one or more computing units, and preventing service level degradation due to an excessive load imposed on the one or more computing units by the monitoring, the monitoring control unit comprising:
processing circuitry; and
memory containing instructions executable by the processing circuitry, whereby the monitoring control unit is operative to:
receive, through an interface of the monitoring control unit, a request to monitor an activity of a target virtual machine of one or more virtual machines executed on a target computing unit of the one or more computing units hosted in the data center, wherein the activity includes a current average bandwidth usage measured at one or more ports of one or more switches, provided in the data center, that are associated with the target computing unit and are used by the target virtual machine;
identify a current allocation of the one or more virtual machines to the one or more computing units hosted in the data center;
identify a load imposed by the activity on the target computing unit under the current allocation;
determine, an estimated load imposed on the target computing unit attributed to the requested monitoring of the activity of the target virtual machine;
determine an enhanced allocation of the one or more virtual machines to the one or more computing units hosted in the data center in response to the reception of the request and in response to a sum of the load imposed on the target computing unit under the current allocation and the estimated load attributed to the requested monitoring exceeding a load limit, such that a sum of an estimated load imposed on the target computing unit under the enhanced allocation and the estimated load attributed to the requested monitoring is below the load limit, wherein the estimated load imposed on the target computing unit under the enhanced allocation is estimated based on prior measurements of load at a mirror-from port of a target switch of the one or more switches that are associated with the target computing unit, and wherein the enhanced allocation is determined based on an estimated bandwidth usage attributed to network traffic;

migrate a subset of the one or more virtual machines so as to reallocate the one or more virtual machines from the current allocation to the enhanced allocation; and monitor the activity of the target virtual machine upon completion of the migration of the sunset of the one or more virtual machines, and providing feedback including the monitored activity of the target virtual machine to a terminal, wherein the migration of the subset of the one or more virtual machines before the monitoring results in the load reduction on the target computing unit below the load limit, thereby preventing service level degradation when the monitoring is performed in the data center.

18. The monitoring control unit of claim 17, wherein the monitoring control unit is operative to identify the current allocation of the one or more virtual machines by instructing an infrastructure control unit provided in the data center to identify the current allocation.

19. The monitoring control unit of claim 17, wherein the monitoring control unit is operative to migrate the subset of the one or more virtual machines by instructing an infrastructure control unit to migrate the subset of the one or more virtual machines so as to reallocate the subset of the one or more virtual machines from the current allocation to the enhanced allocation.

20. A data center hosting one or more computing units, and preventing service level degradation due to an excessive load imposed on the one or more computing units by the monitoring, the data center comprising:

a monitoring control unit, the monitoring control unit comprising processing circuitry and memory, the memory containing instructions executable by the processing circuitry, whereby the monitoring control unit is operative to:

receive, through an interface of the monitoring control unit, a request to monitor an activity of a target virtual machine of one or more virtual machines executed on a target computing unit of the one or more computing units hosted in the data center, wherein the activity includes a current average bandwidth usage measured at one or more ports of one or more switches, provided in the data center, that are associated with the target computing unit and are used by the target virtual machine;

identify a current allocation of the one or more virtual machines to the one or more computing units hosted in the data center;

identify a load imposed by the activity on the target computing unit under the current allocation;

determine, an estimated load imposed on the target computing unit attributed to the requested monitoring of the activity of the target virtual machine;

determine an enhanced allocation of the one or more virtual machines to the one or more computing units hosted in the data center in response to the reception of the request and in response to a sum of the load imposed on the target computing unit under the current allocation and the estimated load attributed to the requested monitoring exceeding a load limit, such that a sum of an estimated load imposed on the target computing unit under the enhanced allocation and the estimated load attributed to the requested monitoring is below the load limit, wherein the estimated load imposed on the target computing unit under the enhanced allocation is estimated based on prior measurements of load at a mirror-from port of a target switch of the one or more switches that are associated with the target computing unit, and wherein the enhanced allocation is determined based on an estimated bandwidth usage attributed to network traffic;

migrate a subset of the one or more virtual machines so as to reallocate the one or more virtual machines from the current allocation to the enhanced allocation; and monitor the activity of the target virtual machine upon completion of the migration of the sunset of the one or more virtual machines, and providing feedback including the monitored activity of the target virtual machine to a terminal, wherein the migration of the subset of the one or more virtual machines before the monitoring results in the load reduction on the target computing unit below the load limit, thereby preventing service level degradation when the monitoring is performed in the data center.

* * * * *